Sept. 19, 1967 E. M. BLOOM, JR., ETAL 3,343,131

PRINTER CONTROL APPARATUS INCLUDING CODE MODIFICATION MEANS

Filed Dec. 31, 1964 3 Sheets-Sheet 1

INVENTORS
EARL M. BLOOM, JR.
VICTOR J. FAIDLEY
BY Henry E. Otto, Jr.
ATTORNEY

United States Patent Office 3,343,131
Patented Sept. 19, 1967

3,343,131
PRINTER CONTROL APPARATUS INCLUDING CODE MODIFICATION MEANS

Earl M. Bloom, Jr., Endicott, and Victor J. Faidley, Apalachin, N.Y., assignors to International Business Machines Corporation, Armonk, N.Y., a corporation of New York Filed Dec. 31, 1964, Ser. No. 422,761
7 Claims. (Cl. 340—172.5)

ABSTRACT OF THE DISCLOSURE

A printer able to print characters corresponding to X coded indicia but not Y coded indicia, upon computer command, causes Y symbol multibit coded data indicia to be modified (by alteration of at least one bit but not all bits) into predetermined counterpart X symbol indicia according to a preselected mutation format, such that either X coded or Y coded input data will be printed as, and as if it were, the X coded counterpart character with no loss of printing speed and at substantially the same speed as if only X coded input data were being received.

Figure 1A:
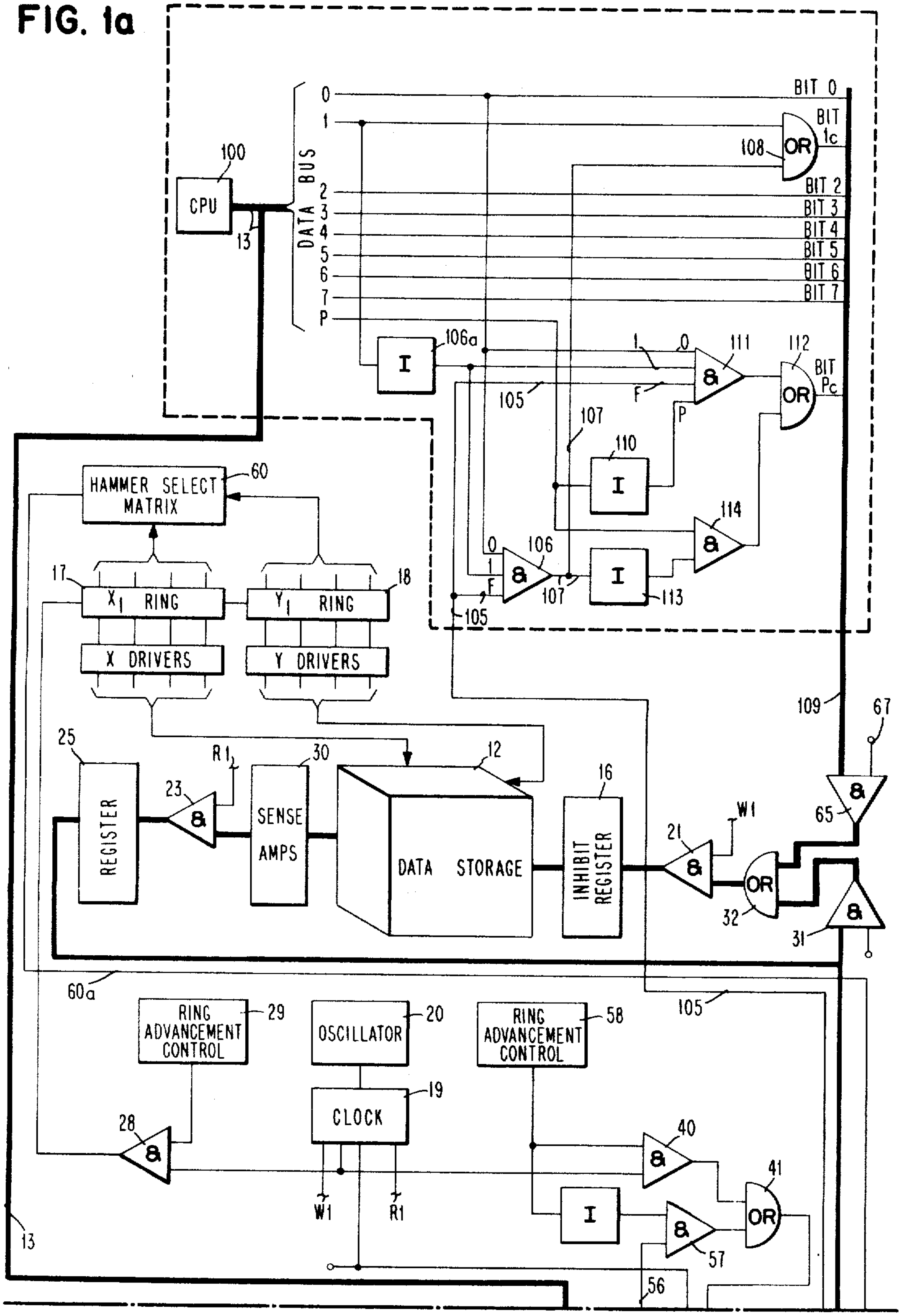

This invention relates to methods and apparatus for controlling printing by high-speed printers under control of data processing machines. The invention relates, more particularly, to improvements in "on-the-fly" printers of the type embodying means for printing any set of graphic symbols up to a prescribed maximum number arranged in any desired sequence on a type chain, train, bar, drum or the like.

"On-the-fly" printers as heretofore proposed comprise a type carrier (such as a continuous type chain) that moves at a constant speed parallel to the print line as a paper web is fed intermittently transversely of the print line through a throat defined between the type chain and a bank of print hammers. Any one of a plurality of such type carriers may be selectively installed, each with a distinctive code arrangement that may include repeated sets of graphic symbols up to the full type capacity of the carrier. Thus, if a "48 AN" (48-character alphanumeric) type carrier is used having 26 upper case alphabetic characters, 10 numerals and 12 special characters, and the carrier has a capacity of 240 graphic symbols, then the 48 AN code can be repeated five times on such carrier.

A particular form of print control apparatus for an "on-the-fly" printer is disclosed in the co-pending application of Fritz Rausch, U.S. Ser. No. 396,517, filed Sept. 15, 1964 (now U.S. Patent 3,303,776 granted Feb. 14, 1967) and assigned to the assignee of the present invention. In that apparatus, when a particular type carrier is installed, the codes corresponding to the distinctive graphic symbols employed on said carrier must be entered into a character storage unit, such that the codes entered at each storage position in said unit corresponds sequentially to those of the successive graphic symbols on the installed type carrier. Each code in the character storage unit is read out in printing position sequence as the various graphic symbols are brought into printing position by movement of the type carrier. A compare circuit matches the codes read out of the storage unit to the codes of the successive graphic symbols of the data record to be printed, which data record had been previously written into a data storage unit in the printer control apparatus. When a particular code read out of the character storage unit and denoting a distinctive graphic symbol (e.g., an A) matches the corresponding (A-defining) code of the data record read out from the data storage unit, an output signal from the compare circuit activates the print hammer at the appropriate printing position to impact the paper against the A-defining type slug.

Assume now that the central processing unit (CPU) receives data from an input-output device such as a data communications terminal that can handle more than the particular 48 characters on the installed type carrier; e.g., that the terminal transmits to the CPU as a data record both lower and upper case alphabetic characters as well as the 10 numerals and 12 special characters. This data would normally be sent from the CPU to the data storage unit; but unless a new type carrier with an expanded set of graphic symbols had been installed previously and the image codes in the character storage unit modified accordingly, comparison cannot be achieved; and hence nothing will be printed, and the printer will stop in accordance with conventional practice after the carrier reaches home position twice. To print out lower case alphabetic characters, the type carrier would have to carry 26 more (i.e., 26 plus 48, or in other words 74) distinctive graphic symbols. Thus in a standard type carrier (which can accommodate up to a maximum of 240 graphic symbols), the full code arrangement could be repeated only three times instead of five times. This would drastically reduce the maximum obtainable printing speed because printing speed for any particular character and hence for all characters collectively obviously depends upon the frequency of appearance of the respective characters on the type carrier. In the illustrative situation just described, if it is not essential that the printer print out both upper and lower case alphabetic characters, the printing speed can be maintained at a high level by printing both upper and lower case alphabetic characters as upper case alphabetic characters by use of a novel printer control method hereinatfer referred to "code folding."

It is therefore one object of this invention to provide an improved printer control apparatus and method for translating and compacting a multiplicity of graphic symbols and/or code arrangements into a predetermined acceptacle smaller group of graphic symbols and/or arrangements to increase printing speed, reduce operating expense and minimize setup time of the printer.

Another object is to provide an improved printer control method and apparatus wherein fewer changes of type carrier are required upon variation in the quantity and nature of graphic symbols constituting data inputs from a CPU to a printer.

Still another object is to provide an improved printer control apparatus selectively conditionable by the operator to provide or prevent "code folding" and wherein "code folding" is automatically terminated upon the occurrence of certain preselected conditions such as shut-off of power.

Another object is to provide an improved printer control method and apparatus wherein the parity bit is automatically adjusted and corrected during a "code folding" operation.

A further object is to provide a printer control method and apparatus which is program-controlled from a CPU to provide greater flexibility of operation than possible in printer control apparatus heretofore employed.

According to these objects a load format latch is set by either a "folding" operation code (Op. code) or a "non-folding" Op. code. This latch controls the loading of the character storage unit and is reset when the loading is completed. The folding latch is set with the folding Op. code; and it is reset with the non-folding Op. code or with "power-on reset" which occurs when power is turned on for the system. The bus out data lines from the central processing unit (nine bits including parity) are sent to the data storage unit without translation if the folding latch is off. If the folding latch is on, and a "0" bit is present and a "1" bit is not present (i.e., $\bar{1}$) on the bus out data lines, an AND gate will be satisfied for adding a "1" bit to the data. In addition, the correct parity is generated for this condition.

This folding capability allows machine codes in excess of those corresponding to the graphic symbols provided on the type carrier to be treated as printable codes and to be printed with no loss of printing speed as selected ones of the symbols provided on the carrier. Therefore, $X+Y$ machine codes can be printed as X graphic symbols at substantially the same speed as for a type carrier having X codes.

Figure 1B:
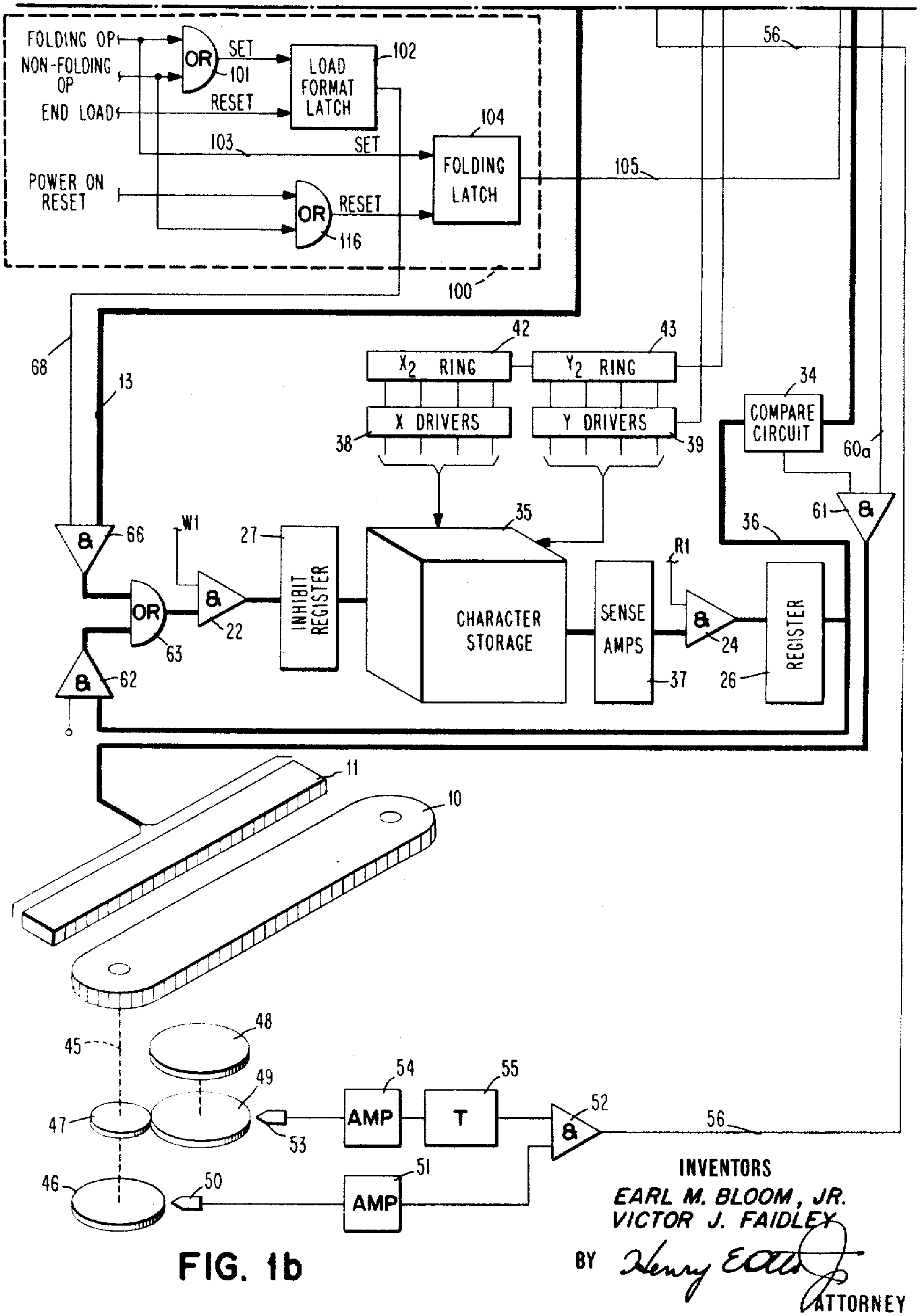
Figure 2:
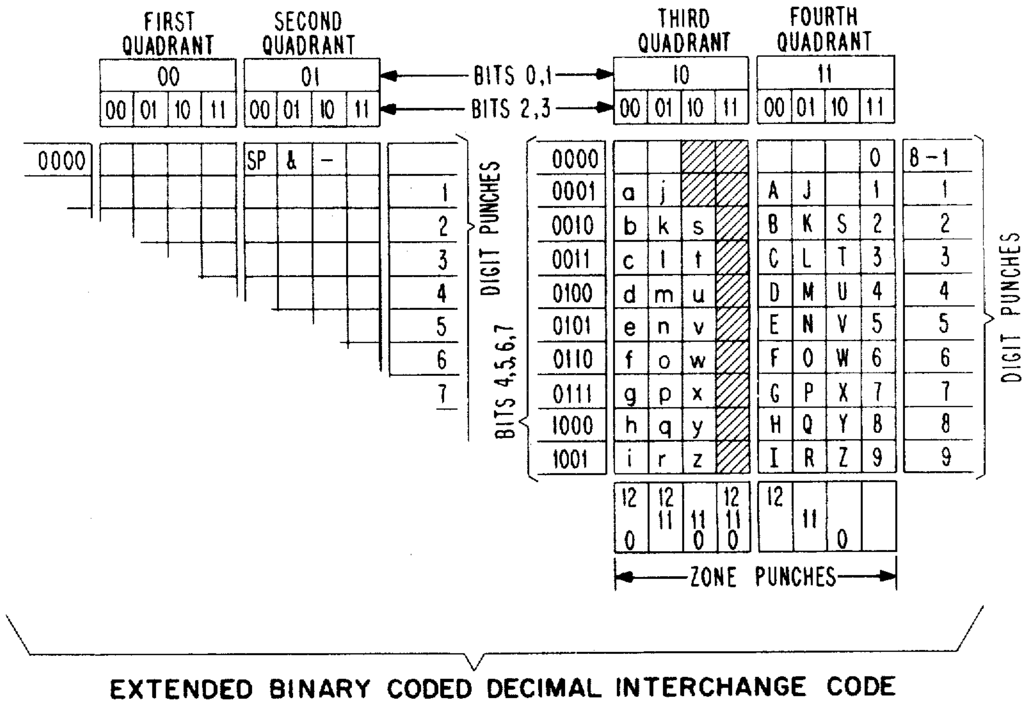

The foregoing and other objects, features and advantages of the invention will be apparent from the following more detailed description of a preferred embodiment of the invention, as illustrated in the accompanying drawings, wherein:

FIGS. 1*a* and 1*b*, when taken together, such that the lower edge of FIG. 1*a* is matched to the upper edge of FIG. 1*b*, constitute a schematic diagram of a printer control apparatus embodying the invention; and FIG. 2 is a fragmentary view of pertinent portions of an Extended Binary Coded Decimal Interchange (EBCDI) code for use with a printer control apparatus that embodies the invention and is to be marketed by applicants' assignee.

*Description*

As illustrated in FIGS. 1*a* and 1*b*, the control apparatus embodying the invention controls operation of a printer comprising a type carrier in the form of an endless type chain 10 that moves at a constant speed in a plane that is parallel to the print line and to a bank of hammers 11 (one per printing position). All of the type characters or symbols to be printed are provided one or more times on the chain 10. As a paper web (not shown) is advanced intermittently upward between the chain and bank of hammers, the particular hammer then at printing position will be actuated to drive the paper into contact with the proper type slug on the chain when the character on said slug is determined to correspond to that of the data to be printed, in the manner presently to be described.

The codes representing the characters of a line of data to be printed are written into the individual positions of a data storage unit 12 under the control of X drivers 14, Y drivers 15, and write inhibit register 16 according to their intended arrangement in the line to be printed. The X drivers 14 and Y drivers 15 are controlled by an X1 address ring 17 and a Y1 address ring 18, respectively, which in turn are advanced step by step by clock pulses provided by a clock pulse generator 19 driven from a continuously oscillating oscillator 20. A clock pulse is supplied at "write time" to a line W1 that is connected in parallel to AND gates 21 and 22 to insure that read-in of coded information to inhibit registers 16 and 27 occurs at the proper time; and, similarly, a clock pulse is supplied at "read time" to a line R1 that is connected in parallel to AND gates 23 and 24 to insure that read-in of coded information into the registers 25 and 26 occurs at the proper time. A pulse is delivered to the X1 address ring 17 and Y1 address ring 18 via an AND gate 28 when a clock pulse is supplied from clock 19 while the output of a ring advance control circuit 29 is conditioned. An output is provided from circuit 29 only when data is read into or out of the data storage unit 12 for printing purposes.

The data storage unit 12 is a core matrix array with nine planes to provide eight data bits and one parity bit. The contents of each storage position of storage unit 12 are read out via sense amplifiers 30 into the register 25 by half-select coincident currents supplied from 14 and 15 to the X and Y drive lines, defining the said storage position. Data from register 25 is rewritten into the same storage position of unit 12 via an AND gate 31 and an OR gate 32 upon reverse flow of half-select coincident currents through the appropriate X and Y drive lines and energization of selected ones of the inhibit drivers 16, in accordance with conventional practice.

Meanwhile, the coded contents of the last-mentioned storage position are simultaneously read out from register 25 through bus 33 to a compare circuit 34. This circuit 34 matches the codes read out of the data storage unit 12 against the codes of the successive graphic symbols on the type chain 10 with which the character storage unit has been previously loaded. As above indicated, these codes should preferably be entered into the character storage unit so as to correspond exactly in code designation and sequence with the code designation and sequence of successive symbols on the chain. The coded information from the character storage unit 35 is read out via sense amplifiers 37 and AND gate 24 into register 26 and thence via a bus 36 to compare circuit 34.

The character storage unit 35 comprises nine planes providing an 8-bit character and a parity bit at each of 240 storage positions corresponding to the 240 characters on the chain 10. The codes representing the successive graphic symbols on the type chain 10 are written into the successive storage positions in character storage unit 35 under the control of X drivers 38, Y drivers 39, and write inhibit register 27 in accordance with their sequential arrangement in the type chain 10. The X drivers 38 and Y drivers 39 are controlled by clock pulses from generator 19 through an AND gate 40, an OR gate 41 and the X2 and Y2 address rings 42 and 43, respectively. The X2 and Y2 address rings 42 and 43 are advanced in synchronism with the movement of type chain 10 in the following manner.

The drive mechanism for the chain 10 is connected via a shaft 45 to a magnetic track disc 46 and also via gears 47 and 48 to a magnetic track disc 49 secured to the same shaft as gear 48. The ratio of the gears 47 and 48 is selected to cause disc 49 to rotate once for each revolution of the chain. Each time a type character on chain 10 is in printing position, a pulse is generated by magnetic indicia on the magnetic disc 46 and transmitted via a magnetic head 50 and amplifier 51 to an AND gate 52. A magnetic track disc 49 has a single magnetic mark which is so located as to transmit a pulse via a magnetic head 53 and amplifier 54 to set a trigger 55 ON when the chain occupies a predetermined position; viz., when that type character or symbol corresponding to the character at storage address "1" in storage unit 35 is opposite the first print hammer 11. This is so that advancement of the X2 and Y2 address rings 42 and 43 will start at the proper time and remain synchronized with the movement of the type chain throughout a complete revolution. With trigger 55 ON, pulses picked up by magnetic head 50 can pass through AND gate 52 to a line 56.

To perform a printing operation, advancement of the X2 and Y2 address rings 42 and 43 is effected in either of two ways; first, by a clock pulse supplied from generator 19 while the output of ring advancement control circuit 58 is conditioned and satisfies an AND gate 40 to supply a pulse to rings 42 and 43 via OR gate 41; and secondly, by a pulse transmitted via line 56 through and AND gate 57 and the OR gate 41, provided the ring advancement control circuit 58 is not conditioned. Hence, assuming that the type chain carries 240 characters and that the character storage unit 35 has a corresponding number of 240 storage positions or addresses, each advancement of the type chain one type character width will result in 240 advance pulses being supplied from the clock pulse generator 19 via gates 40, 41 to the X2 and Y2 address rings 42 and 43; and a single advance pulse will be supplied via AND gate 52, line 56, AND gate 57 and OR gate 41 to said X2 and Y2 address rings. Since the clock pulse generator 19 controls the X1 and Y1 address rings 17 and 18 and also controls the X2 and Y2 address rings 42 and 43, read-out of the two storage units 12 and 35 will be effected simultaneously; however, after each complete read-out of storage unit 12, the read-out of storage unit 35 will start with a one-position shift caused by the pulse supplied from disc 46 via AND gate 52.

Note that the X1 and Y1 address rings 17 and 18 are so connected to a hammer selection matrix 60 that the preselected number of print hammers 11 are conditioned for successive actuation through a bus 60a and a corresponding number of AND gates 61 in synchronism with the read-out of the storage positions in data storage unit 12. However, a particular print hammer will be actuated only if a pulse is supplied to the corresponding AND switch 61 signifying that the compare circuit 34 has detected the presence of identical character codes in the registers 25 and 26.

Regeneration of the coded information in each of the storage positions of storage unit 35 is effected in a manner similar to that used to regnerate coded data in storage unit 12. Briefly, the coded information read out from the register 26 into the compare circuit 34 is also written back into the same storage position via AND gate 62, OR gate 63, AND gate 22 and inhibit register 27 when a pulse is supplied to line W1 at "write time."

The apparatus as heretofore described is substantially identical with that disclosed in the above-identified Rausch application.

According to the present invention, the codes corresponding to the distinctive graphic symbols employed on the type chain 10 are transferred from the main storage unit (not shown) of a central processing unit (CPU) 100 and loaded into the character storage unit 35 in correct sequence in response to either of two program commands. These commands (referred to as CCW or command control word operation codes) may be a "folding" Op. code (11110011) or a "non-folding" Op. code (11111011).

If either of these commands is given, a signal will be transmitted via an OR gate 101 to set a load format latch 102 to bring up a signal in line 68 that is AND'ed at 66 with the data bus 13. Thus, new coded information corresponding to that then in data bus 13 will be loaded into character storage unit 35 via OR gate 63, AND gate 22 and inhibit register 27 when a clock pulse is supplied from pulse generator 19 to line W1 at "write time." When loading is completed, the load format latch 102 will be reset by an "end load" signal that is generated as soon as the code has been loaded into the last storage position of the character storage unit 35; and this will bring down the signal in line 68, with a result that the contents of storage unit 35 will remain unchanged until a "folding" command or a "non-folding command is subsequently given and again sets the load format latch 102.

Before describing the additional operations that occur in response to these "folding and "non-folding commands, it is to be noted that the Extended Binary Coded Decimal Interchange (EBCDI) code partially illustrated in FIG. 2 contains four quadrants denoted by 00, 01, 10, and 11 in the "0" and "1" bit positions as numbered from the left-most bit. Since the EBCDI code is an 8-bit binary code, it provides 256 distinctive code designations. The first quadrant embraces codes 00000000 through 00111111 and is reserved for miscellaneous command codes unique to devices other than printers. The second quadrant embraces codes 01000000 through 01111111 and is reserved for special characters such as the "&," etc. The third quadrant embraces codes 10000000 through 10111111 including those for the 26 lower case alphabetic characters; whereas the fourth quadrant embraces codes 11000000 through 11111111 including those for the 26 upper case alphabetic characters and 10 numeric characters.

For purposes of the present invention, we need be concerned only with the portions of the third and the fourth quadrants actually shown in FIG. 2. Note that with the EBCDI code format, the code for each respective lower case alphabetic character differs from the code for the corresponding upper case version of the same alphabetic character by only a single bit; namely, the "1" bit which is the second bit from the left of the 8-bit character. For example, the 8-bit code for lower case alphabetic character "*a*" is 10000001; whereas the code for the upper case "A" is 11000001.

When the illustrative embodiment of the present invention is employed in a printed control system controlled by the EBCDI code illustrated in FIG. 2, a "folding" Op. code command will cause "folding" of the third quadrant into the fourth quadrant. As a result, any lower case alphabetic character included in the data record supplied from the CPU will be printed out as the corresponding upper case alphabetic character; and any upper case alphabetic character in such data record will be printed out as such, without modification, in the manner now to be described.

Assume now that the "folding" Op. code command has been given, and the character storage unit 35 has been loaded in the manner just described. The resultant signal will be transmitted via a line 103 to set a folding latch 104 and thus bring up a signal in a line 105. If a "0" bit is present and a "1" bit is not present while line 105 is up, AND gate 106 will pass an up signal to line 107 because of inverter 106a. Hence, a "1" bit will be entered via an OR gate 108 in the modified or corrected "1" bit, designated at "$1_c$" and forming a part of bus 109 leading to AND gate 65. Also, the parity bit P will be modified automatically to correct for the entry of the "1" bit. For example, if the parity bit had been a "0," it will be inverted at 110; and, hence, with all four inputs to AND gate 111 up under the above assumed condition, a "1" will be entered in the corrected parity bit $P_c$ via OR gate 112. On the other hand, if the parity bit P had been a "1," AND gate 111 cannot be satisfied; and, since the up-level signal provided in line 107 as a result of the "folding" command will be inverted at 113, AND gate 114 can no longer be satisfied, with the result that both inputs to OR gate 112 will drop and, hence, convert $P_c$ to a "0."

Thus, in response to a "folding" command, the parity bit $P_c$ will be automatically corrected and a "1" bit will be entered into the bus 109. This will change the code of the data that is written into data storage unit 12 from bus 109 via AND gate 65 when a write signal is suitably provided to line 67. With the EBCDI code illustrated, if the full 8-bit code before folding corresponded to that for a particular lower case alphabetic character, the code will be automatically translated into the code for the corresponding upper case character. As explained in detail earlier, this desirably permits a "48 AN" (48-character alphanumeric) chain having only upper case alphabetic characters to be used to print out, as upper case alphabetics, data supplied from an input-output unit as either upper case or lower case alphabetic characters, and thus achieve the above-explained objects and advantages of the present invention.

By way of contrast, if the "non-folding" Op. code command is given, the data to be printed will be supplied to bus 109 in exactly the same code as supplied to the data bus 13. For example, the "non-folding" command will provide a signal via an OR gate 116 to reset the folding latch 104 and thus bring down the signal in line 105. This will disable AND gate 106, preventing entry of a "1" bit into bus 109 via OR gate 108. It will also disable AND gate 111. Since the output from inverter 113 will be up, the parity bit $P_c$ will be effectively controlled according to the value of the P bit in data bus 13, because gates 114 and 112 will be virtually ineffectual.

When there is no provision for folding or when a "non-folding" command is given, the codes of the data supplied to the data storage unit 12 must correspond to the codes of the graphic symbols on the installed type chain and hence those entered into the character storage unit 35. Otherwise, the compare unit 34 will not provide outputs to the AND gate 61; and hence nothing will be printed at that particular printing position. Conventional means (not shown) is provided to stop printing if the chain 10 or other type carrier reaches home position twice before a code match is or can be effected.

Note that the folding latch 104 will be reset automatically and hence terminate folding upon the occurrence of preselected conditions; e.g., in the embodiment illustrated, when a "non-folding" command is given or power is turned on; but note that the contents of the character storage unit 35 are retained even if power is turned off.

Both folding and non-folding commands are provided so that the folding feature may be rendered optional and employed only under program control or some other form of operator control. For example, in the situation illustrated, if lower case codes would never be sent to a printer having only upper case characters in its type carrier, then the non-folding Op. code should be used.

While the folding apparatus and method disclosed in the illustrated embodiment of the invention have been used to fold lower case alphabetic characters into corresponding upper case characters, it is to be understood that the invention may be employed to translate any set of graphic symbols into an acceptable or preferred substitute set of graphic symbols. For example, by folding of appropriate code formats different than the EBCDI format herein illustrated, intermixed Roman numeral and Arabic numeral inputs could be translated and printed out solely as Arabic numerals; and foreign language symbols or words may be translated automatically into English language symbols or words. It will also be understood that more than one data bit may be modified to effect the folding or translation operation, and that the same bit or bits need not necessarily be modified during folding of each character of one set into a counterpart character of a different set. All that is required is that the modification be effected according to some predetermined pattern of code mutation.

While the invention has been particularly shown and described with reference to a preferred embodiment thereof, it will be understood by those skilled in the art that the foregoing and other changes in form and details may be made herein without departing from the spirit and scope of the invention.

What is claimed is:

1. A printer control apparatus wherein coded multibit indicia corresponding to incoming data must be matched with that corresponding to characters within a preselected group that are printable from an installed type carrier means in order to permit a printing operation, wherein the improvement comprises the provision of:

means for modifying at least one bit but not all bits of the coded indicia of all incoming data according to a preselected code mutation format to alter coded indicia corresponding to characters not within such group by such mutation into preselected acceptable counterpart characters which are within such group and hence among those printable from the type carrier means, whereby a type carrier means with limited character printing capability may print out acceptable substitutes from incoming data beyond such limited capability.

2. A printer control apparatus according to claim 1, wherein the modifying means is variously conditionable and operative under one condition to perform such modification and ineffective under another condition to perform such modification, and means including means under computer program control for controlling conditioning of said modifying means.

3. Apparatus for transforming coded multibit data indicia representing anticipated unprintable characters into corresponding coded multibit data indicia representing acceptable counterpart printable characters where the coded multibit indicia of each such printable character and is corresponding counterpart have some bits but not all bits identical, said apparatus comprising:

character storage means for storing coded indicia corresponding to the predetermined coded indicia for the printable characters, data storage means for receiving coded indicia corresponding to the data to be printed, means for cyclically comparing the coded indicia from said character storage means and data storage means to provide a comparison signal upon identity of said indicia, means conditioned responsively to such signal for permitting a printing operation, and means conditioned responsively to another signal to cause at least one bit but not all bits of the incoming data to be modified before it is loaded into said data storage means such that an unprintable character will be converted into its respective counterpart printable character and a comparison signal can be generated to enable printing, as a particular printable character of data that originated as that same character or the counterpart.

4. Printer control apparatus comprising, in combination, character storage means for storing multibit coded indicia corresponding to the predetermined coded indicia for each respective character in a group of printable characters, data storage means for receiving coded indicia corresponding to data to be printed, means for cyclically comparing the coded indicia from said character storage means and data storage means to provide a comparison signal upon identity of such indicia, means including means responsive to such signal for permitting a printing operation only when the coded indicia in the data storage means matches that in the character storage means, means for providing a command signal, a data bus including one bit line for each bit position of the multibit coded indicia, and means for controlling entry of data from the data bus into the data storage means, this last-named means including means responsive to said command signal to insert a preselected bit condition in at least one certain bit line but not all lines of the data bus such that all incoming data whether actually having this preselected bit condition or its complement in such certain bit lines will be treated as if it had said preselected bit condition therein, the coded indicia without said preselected bit condition in said certain bit lines corresponding to that for an unprintable character and the identical coded indicia except with predetermined said bit condition in said certain bit lines constituting that for the counterpart printable character into which said particular unprintable character is transformed.

5. A printer control apparatus according to claim 1, further characterized in that the characters not within said group comprise one case of alphabetic characters and the characters within said group comprise the other case of said alphabetic characters, such that any particular character originating as data of one said case will be printed out as the other case version of the same particular character.

6. Printer control apparatus comprising, in combination, type carrier means having at least one set of X plus $n$ graphic symbols denoted by distinctive multibit coded indicia, character storage means for storing coded indicia corresponding to the predetermined coded indicia for the symbols on the carrier means, data storage means for receiving coded indicia corresponding to data to be printed, which data may include X plus $n$ plus Y graphic symbols, means for cyclically comparing the coded indicia from said character storage means and data storage means to provide a comparison signal upon identity of such indicia, means including means responsive to such signal for permitting a printing operation by the carrier means only when the coded indicia in the storage means matches that in the character storage means, and means conditioned responsively to a command signal to cause Y symbol coded indicia to be modified and loaded into the data storage means as predetermined counterpart X symbol coded indicia and printed out as such X symbols during such printing operation, the last introduced means in the absence of said command signal being ineffective to cause such modification, with the result that any Y symbol codes included in the data loaded into the data storage means cannot produce a comparison signal and hence will not be printed.

7. In a printer control apparatus controlled from a central processing unit, the combination of character storage means for storing coded indicia corresponding to printable characters, data storage means for receiving coded indicia corresponding to the data to be printed, means for cyclically comparing the coded indicia from said character storage means and data storage means to provide a comparison signal upon identity of such indicia, means including means responsive to such signal for permitting a printing operation only when coded indicia in the data storage means matches that in the character storage means, a data bus, control means, including means conditioned by the processing unit, to cause indicia in the data bus to be loaded into said character storage means, and means interposed between the data bus and data storage means and conditioned by the control means to modify coded data indicia corresponding to anticipated unprintable characters into coded indicia representing acceptable counterpart printable characters to enable a comparison signal to be generated by the comparing means to cause printing of any such unprintable character as its respective counterpart printable character.

References Cited

UNITED STATES PATENTS

| | | | |
|---|---|---|---|
| 2,993,437 | 7/1961 | Demer et al. | 340—172.5 X |
| 3,111,648 | 11/1963 | Marsh et al. | 340—172.5 X |
| 3,167,746 | 1/1965 | Reines et al. | 340—146.3 |
| 3,234,521 | 2/1966 | Weisbecker | 340—172.5 |
| 3,262,100 | 7/1966 | Bespalko et al. | 340—172.5 |

ROBERT C. BAILEY, *Primary Examiner.*

PAUL J. HENON, *Examiner.*